United States Patent [19]

Truty

[11] Patent Number: 4,894,504

[45] Date of Patent: Jan. 16, 1990

[54] METHOD APPARATUS FOR GENERATING MULTIPLE SPARKS FOR AN ELECTRICAL DISCHARGE WIRE CUTTING MACHINE

[75] Inventor: Thomas J. Truty, Streamwood, Ill.

[73] Assignee: T-Star Industrial Electronics Corporation, Wheeling, Ill.

[21] Appl. No.: 214,113

[22] Filed: Jun. 30, 1988

[51] Int. Cl.$^4$ ............................................. B23H 7/04
[52] U.S. Cl. ................................... 219/69.12; 219/69.13
[58] Field of Search ............... 219/69 P, 69 C, 69 W, 219/69 V, 69.18, 69.13, 69.12, 69.2

[56] References Cited

U.S. PATENT DOCUMENTS

| | | | |
|---|---|---|---|
| 4,104,502 | 8/1978 | Ullmann et al. | 219/69 W |
| 4,243,864 | 1/1981 | Vieau et al. | 219/69 W |
| 4,347,424 | 8/1982 | Obara | 219/69 P |
| 4,559,434 | 12/1985 | Kinoshita | 219/69 C |
| 4,598,190 | 7/1986 | Balleys | 219/69 W |

FOREIGN PATENT DOCUMENTS

| | | | |
|---|---|---|---|
| 59-47123 | 3/1984 | Japan | 219/69 C |
| 175922 | 10/1984 | Japan | 219/69 C |
| 141429 | 7/1985 | Japan | 219/69 W |
| 34724 | 2/1987 | Japan | 219/69 C |
| 39126 | 2/1987 | Japan | 219/69 V |

Primary Examiner—Derek S. Jennings
Assistant Examiner—Geoffrey S. Evans
Attorney, Agent, or Firm—George Pappas

[57] ABSTRACT

An electrical discharge wire cutting machine (EDWC) includes an apparatus for controlling the flow of electrical energy between an electrically conductive piece part and a wire electrode of the EDWC machine. A pulse type power supply has first and second leads of opposite polarity with the first lead being electrically connected to the piece part and the second lead having first and second portions connected to the wire electrode at two separate, spaced-apart locations. Diodes electrically isolate the first and second portions of the second lead line whereby the first and second portions of the second lead line are electrically independent from one another. Further, first and second independently controllable arrays of capacitors are connected between the first lead line and the first and second portions of the second lead line respectively. The capacitance of these arrays is controllably adjustable to a range of values suitable for the instantaneous cutting conditions.

21 Claims, 6 Drawing Sheets

FIG_4

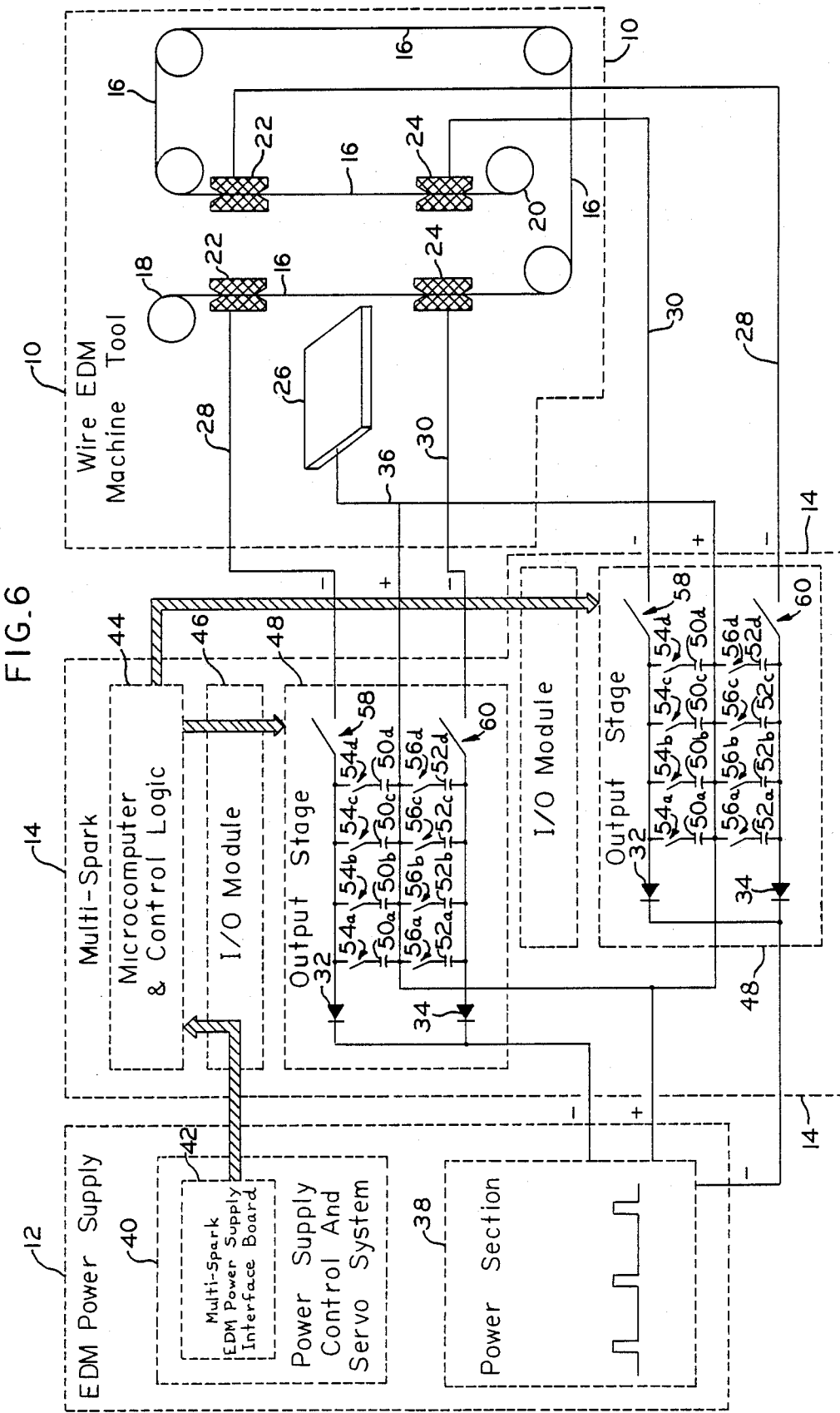

METHOD APPARATUS FOR GENERATING MULTIPLE SPARKS FOR AN ELECTRICAL DISCHARGE WIRE CUTTING MACHINE

BACKGROUND OF THE INVENTION

1. Field of the Invention

This invention relates generally to electrical discharge machining and, more particularly, to an improved method and apparatus for controllably delivering multiple sparks from a nonconsumable wire electrode to a workpiece.

2. Description of the Related Art

Electrical discharge wire cutting (EDWC) is a process that can be analogized to the operation of a bandsaw. In the case of EDWC, the "saw" is a wire electrode of small diameter that removes material by electrical erosion, thereby producing the appearance of the wire cutting through a workpiece. However, unlike the bandsaw, there is no actual contact between the wire and the workpiece, but rather, material removal is effected by spark erosion. Typically, a power supply has leads of opposite polarity connected to the workpiece and the wire respectively. Thus, when the wire and workpiece move sufficiently close to one another, the power supply voltage overcomes the resistance of air and current begins to flow through the air. This sudden manifestation of electrical current through air is directly observable as a spark. This same natural phenomena is observed daily on a much smaller scale as static electricity, or on a much larger scale as lightning. It should be appreciated that the greater the distance between the wire and workpiece, the greater the voltage necessary to overcome the resistance.

Further, the electrical erosion process generates large amounts of heat which should preferably be removed to prevent distortion of the workpiece. Air, unfortunately, does not have good heat transfer characteristics, but water does.

Deionized water is typically used to cool the workpiece because, like air, it only conducts electricity when the voltage drop across the spark gap is sufficient to ionize the water. Moreover, by concentrating the dielectric water into a high-velocity stream, the workpiece is not only cooled, but the removed material is effectively flushed away. Accordingly, the sparks actually occur in the deionized water media, rather than air.

These sparks carry sufficient current to locally heat the workpiece beyond its melting point. In fact, each spark vaporizes or melts a very small portion of the workpiece which is then flushed away by the constant stream of dielectric fluid. Thus, by continuously producing sparks, all of the workpiece material within a preselected spark gap distance from the wire is ultimately melted and flushed away. It can be seen that by advancing the wire through the workpiece, a kerf is produced in the workpiece much like that produced by a bandsaw. In most cases, movement of the wire and workpiece is controlled by a computer aided numerical control machine, which is capable of producing piece parts of complex and varied configurations.

EDWC is a process which is normally limited to unusual manufacturing operations that cannot be accomplished by more mainstream manufacturing tools (i.e. drills, punches, lathes, grinders, bandsaws, etc.). For example, EDWC is often used to cut hardened steel. Unlike the more conventional machine tools, EDWC is unaffected by the hardness of the material being cut. Thus, the material can be hardened prior to cutting and then electrically cut to a precise tolerance. Conversely, using conventional machine tools forces the manufacturer to harden the piece part after cutting. This post cutting hardening has serious repercussions, in that the piece part is distorted by the heat treating process.

While EDWC has achieved success in these specialized areas, the process has not realized widespread use. The cutting speed is relatively slow when compared to more conventional machine tools operating on non-hardened materials. Therefore, EDWC is not economically competitive with conventional machine tools. Accordingly, in order to expand EDWC into these more traditional areas, much attention has been focused on increasing the cutting rate of EDWC machines.

Unfortunately, prior systems have been generally unable to increase cutting speed without adversely affecting the quality (e.g. smoothness) of the cut. This is not totally unexpected since one obvious method of increasing cutting speed is to increase the volume of material removed by each spark. Clearly, if the energy delivered in each spark is increased, the degree of piece part heating will also increase, and the amount of material which is melted or vaporized must also correspondingly increase. However, material removal by spark erosion creates shallow, crater-shaped cavities. The depth of these cavities is proportional to the energy contained in the spark. Therefore, it can be seen that the greater the energy, the faster the cut, and the deeper the crater with a corresponding increase in surface roughness.

Accordingly, further increases in cutting speed were effected by increasing the rate at which sparks were delivered to the workpiece. The evolution of electrical discharge machining power supplies has generally been from the capacitive discharge type to pulse-type power supplies. In pulse-type power supplies, power is delivered directly to the wire electrode, resulting in a single high power discharge for each power supply pulse. However, as discussed previously, the amount of energy introduced by each spark must be limited to prevent excessive roughness and wire breakage. Further, it should also be recognized that each discharge not only melts or vaporizes a portion of the workpiece, but also produces the same effect on the wire electrode. Accordingly, the amount of energy need also be limited to prevent destroying the wire electrode.

Although it is generally true that the evolution has been toward pulse-type power supplies, it is also commonly recognized that capacitor discharge power supplies do offer some cutting advantages on certain materials. In fact, applicants have developed a capacitor discharge modification (FAST-TRACK I) to be used in conjunction with pulse type power supplies. This modification, in concert with other electronic, mechanical, and hydraulic modifications has a considerably faster cutting rate in most applications. The FAST-TRACK I unit has achieved a material removal rate in the range of 2-3 times greater than pulse-type EDWC. In the FAST-TRACK I capacitor type EDWC, the capacitor is periodically charged by high-power pulses from the power supply and produces numerous high-speed discharges between each periodic charging. Thus, the same energy that the pulse-type unit delivers in a single pulse is delivered by the FAST-TRACK I capacitor type unit in numerous, lower energy pulses. Therefore, more energy can be supplied in each charging pulse since it is dissipated over several discharges. With this higher energy input, the capacitor-type unit removes more material and cuts at a faster rate.

In FAST-TRACK the capacitor is selected to be of a size suitable for general purpose cutting and produces optimal discharge characteristics for a narrow range of materials. It is advantageous to select a capacitance value based upon the type of cut being performed, the material being cut, the thickness of the material, and other variables. Consequently, even while cutting a single piece part it is desirable to alter the value of the capacitance to the immediate conditions being experienced. Such "on the fly" adjustments to the capacitance are not possible on the FAST-TRACK unit.

Further, while FAST-TRACK effectively increases the number of discharges within a given time period, there is an upper limit to the frequency of these discharges. The discharge rate of the capacitor ultimately determines the frequency at which sparks are generated. It is desirable to further increase the spark generating rate to correspondingly increase the cutting speed without adversely affecting the quality of the cut.

SUMMARY OF THE INVENTION

The primary goal of the invention is to provide an electrical discharge wire cutting machine which has increased cutting speed without a corresponding increase in surface roughness.

Another goal of the invention is to provide multiple spark emissions from a single wire electrode.

Yet another goal of the invention is to provide a controllable array of storage elements for storing a variable charge of a preselected magnitude and delivering the stored charge to the wire electrode.

Yet another goal of the invention is to provide a means for bypassing the controllable storage elements and delivering power directly to the wire electrode.

To attain these goals, an apparatus is provided for controlling the flow of electrical energy between an electrically conductive piece part and a wire electrode of an electrical discharge wire cutting machine. The apparatus includes a pulse type power supply having first and second leads of opposite polarity. The first lead is electrically connected to the piece part and the second lead has first and second portions connected to the wire electrode at two separate, spaced-apart locations. Means electrically isolates the first and second portions of the second lead line whereby the first and second portions of the second lead line are electrically independent from one another.

In accordance with another aspect of the present invention, an apparatus is provided for controlling the flow of electrical energy between an electrically conductive piece part and a wire electrode of an electrical discharge wire cutting machine. The apparatus includes a pulse type power supply and means for connecting at least two electrically isolated discharge circuits between the pulse type power supply and the wire electrode. Each of the discharge circuits produces electrically erosive sparks independent from one another.

In accordance with yet another aspect of the present invention, an apparatus is provided for controlling the flow of electrical energy between an electrically conductive piece part and a wire electrode of an electrical discharge wire cutting machine. The apparatus includes a pulse type power supply having first and second leads of opposite polarity. The first lead is electrically connected to the piece part and the second lead has first and second portions connected to the wire electrode at two separate, spaced-apart locations. First and second diodes are respectively disposed in the first and second portions of the second lead line. First and second pluralities of capacitors are disposed between the first lead line and the first and second portions of the second lead line respectively. Switching means controllably connects each of the capacitors to the first lead line and the first and second portions of the second lead line respectively in response to receiving a control signal. The apparatus further includes means for monitoring preselected parameters of the electrical discharge wire cutting machine, determining the value of the control signals in response to the values of the preselected parameters, and delivering the control signals to enable the switching means to connect preselected combinations of the capacitors between the first lead line and the first and second portions of the second lead line respectively.

BRIEF DESCRIPTION OF THE DRAWINGS

Other objects and advantages of the invention will become apparent upon reading the following detailed description and upon reference to the drawings in which.

Figure 1:
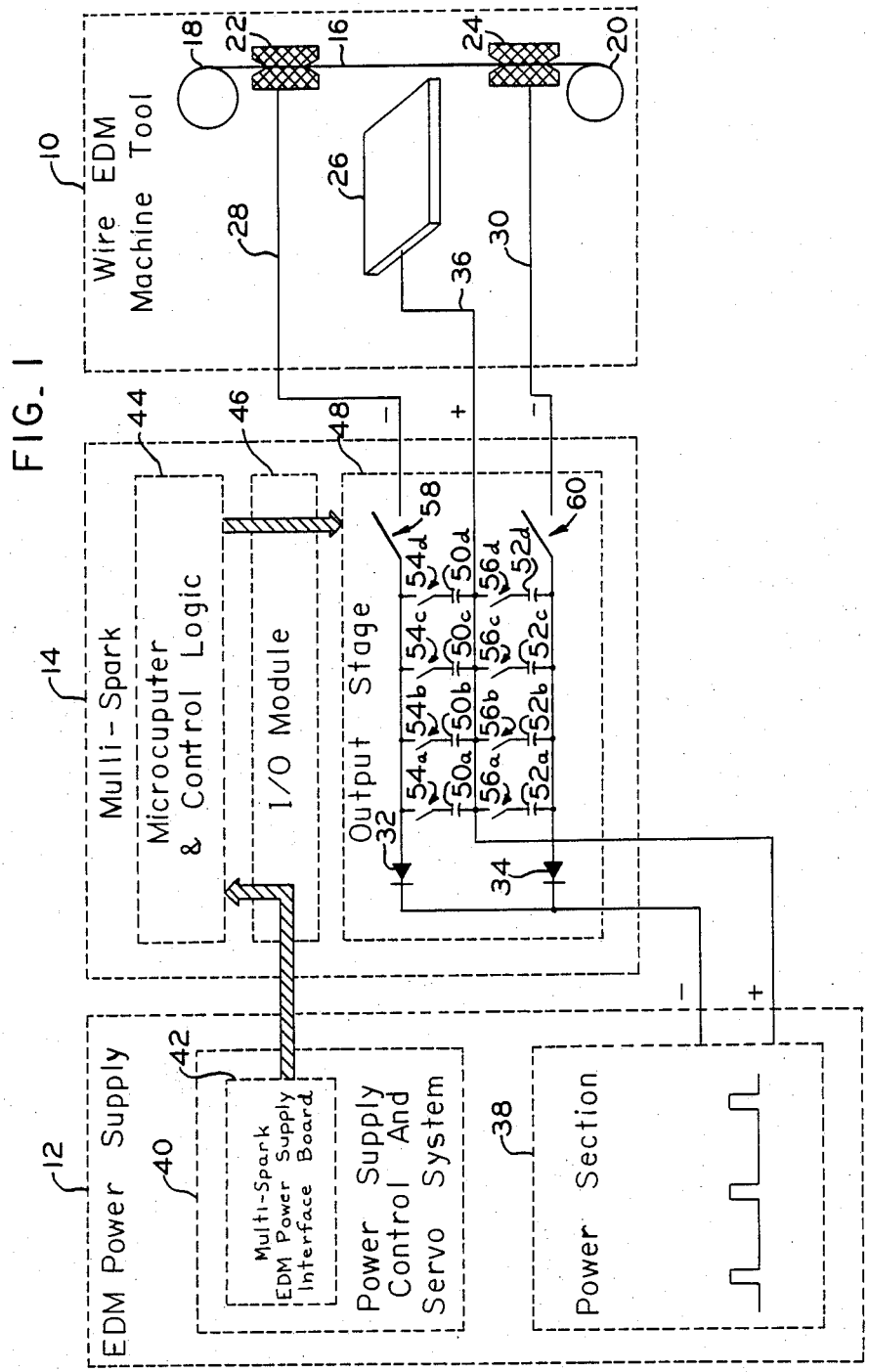
FIG. 1 is a top level block diagram of an electrical discharge wire cutting machine.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Turning now to the drawings, FIG. 1 illustrates a top level diagram of an EDWC machine 10, its power supply 12, and a multi-spark control 14 connected therebetween. The EDWC machine 10 includes a wire electrode 16 with an output spool 18 and a collection spool 20. New, unused wire on the output spool 18 is fed through a pair of current pick-ups 22, 24 which are respectively positioned above and below a workpiece 26. From the lower current pick-up 24, the wire is passed to the collection spool 20. The collection spool 20 is rotatably driven, preferably by an electric motor (not shown), so as to draw wire from the output spool

18. Using this method, unused wire is continuously presented in the cutting region. Thus, damage to the wire from spark erosion is spaced over a length of wire and not localized. This reduces the possibility that the wire will break from excessive erosion caused by multiple sparks from a single location.

Electrical energy is provided to the wire 16 by the pair of pick-ups 22, 24. The wire 16 physically engages the pickups 22, 24 which are preferably constructed of carbide to resist frictional wear. A pair of lead lines 28, 30 respectively connect the pick-ups 22, 24 to the negative output of the power supply 12. The lead lines 28, 30, are however, electrically isolated from one another by a pair of fast-acting, high-power diodes 32, 34. The diodes 32, 34 are arranged with their cathodes connected in common to the negative output of the power supply 12 and their anodes respectively connected to the pick-ups 22, 24.

The electrical circuit is completed by the piece part 26 being electrically connected to the positive output of the power supply 12 via a lead line 36. Therefore, while only a single power supply 12 is provided, the addition of the diodes 32, 34 effectively implements two separate power supplies. Electrical discharges between the wire 16 and piece part 26 occur from either or both effective power supply, and in particular, from both at the same time.

The power supply 12 includes a power section 38 which produces a series of positive pulses at a preselected frequency (preferably in excess of 80–90 KHz). The positive and negative outputs of the power section 38 are connected to the appropriate lead lines 36, 28, 30.

Also included within the power supply 12 is the control and servo system 40 which is primarily responsible for controlling the computer aided numerical control positioning system. Connected to and included within the power supply control and servo system 40 is an interface 42 for the multi-spark control 14. It should be noted that the EDWC machine 10 and power supply 12 are standard components, such as those available from Agie U.S.A. Ltd. as model number 100D. The multi-spark control 14 and its associated interface 42 are add-on components intended to enhance the performance of the basic machine. The interface 42 receives signals which contain information concerning the current operating parameters of the machine and deliver those signals to the multi-spark control 14. The control 14 interprets those signals and develops an appropriate control scheme for the power delivered to the EDWC machine 10.

The multi-spark control 14 includes three separate, distinct areas of control: a microcomputer and control logic 44, an I/O module 46, and an output stage 48. The I/O module 46 regulates the delivery of signals from the interface 42 to the microcomputer 44, as well as the delivery of signals from the microcomputer 44 to the output stage 48.

The output stage 48 is ultimately responsible for delivering power to the EDWC machine 10. Further, the method of delivering the power, while being controlled by the microcomputer 44, is ultimately implemented in the output stage 48. As discussed previously, the output stage 48 includes the pair of fast-acting, high-power diodes 32, 34 to electrically isolate the two negative branches of the power supply leads 28, 30.

Further, the output stage 48 is configured to operate as either a capacitive discharge or a straight through pulse delivery type EDWC machine. Control over these multiple configurations is effected by two arrays of capacitors 50a–50d, 52a–52d and two sets of associated switching means 54a–54d, 56a–56d respectively. The switching means 54a–54d, 56a–56d are independently actuable, such that any or none of the capacitors is electrically connected into the circuit. For example, controllably energizing each of the switching means 54a–56d to be in a nonconduct capacitors from being charged, but rather, delivers the power supply pulses directly to the current pick ups 22, 24 and the piece part 26. Consequently, in this configuration no charge is stored in the capacitors 54a–56d, and any discharges between the piece part 26 and wire 16 will necessarily occur during the high portion of the power supply signal.

Conversely, any combination of the switching means 54a–54d, 56a–56d are energizable to a conductive state, whereby the selected capacitors 50a–50d, 52a–52d are connected in parallel with the piece part 26 and current pick-ups 22, 24 respectively. Only those capacitors 50a–52d which has corresponding switching means 54a–56d that are conductive will be charged. Thus, it should be appreciated that the microcomputer 44 controls the magnitude of the charge stored in the capacitive mode of operation by controlling the total capacitance connected into the circuit. Further, unlike the straight through pulse delivery type EDWC machine the capacitors 50a–52d discharge at any time, independent of the instantaneous state of the power supply 38. For example, even when the pulse type power supply 38 is in a low state, capacitors 50a–52d have been charged by the preceding high state. Thus, any time, and in particular at multiple times, at which the voltage stored on the capacitors 50a–52d is sufficient to generate a spark, a discharge will occur.

A third mode of operation is accomplished by the operation of a pair of switching means 58, 60 disposed in the negative lead lines 28, 30 intermediate the capacitor arrays 50a–52d and the current pick-ups 22,24. Standard EDWC power supplies (i.e. the Agie 100D) produce pulses which have a minimum "on time" of 1 microsecond. In certain modes of operation it is preferable that the pulse duration be significantly less than 1 microsecond. Accordingly, the switching means 58, 60 are switched off to pass only a preselected portion of the 1 microsecond pulse, with the remaining portion of the pulse charging the capacitors and being released during the multiple smaller discharges of the capacitors. In this manner, the switching means 58, 60 serve to offer increased controllability of the 1 microsecond fixed pulsing time of the power supply.

Figure 2:
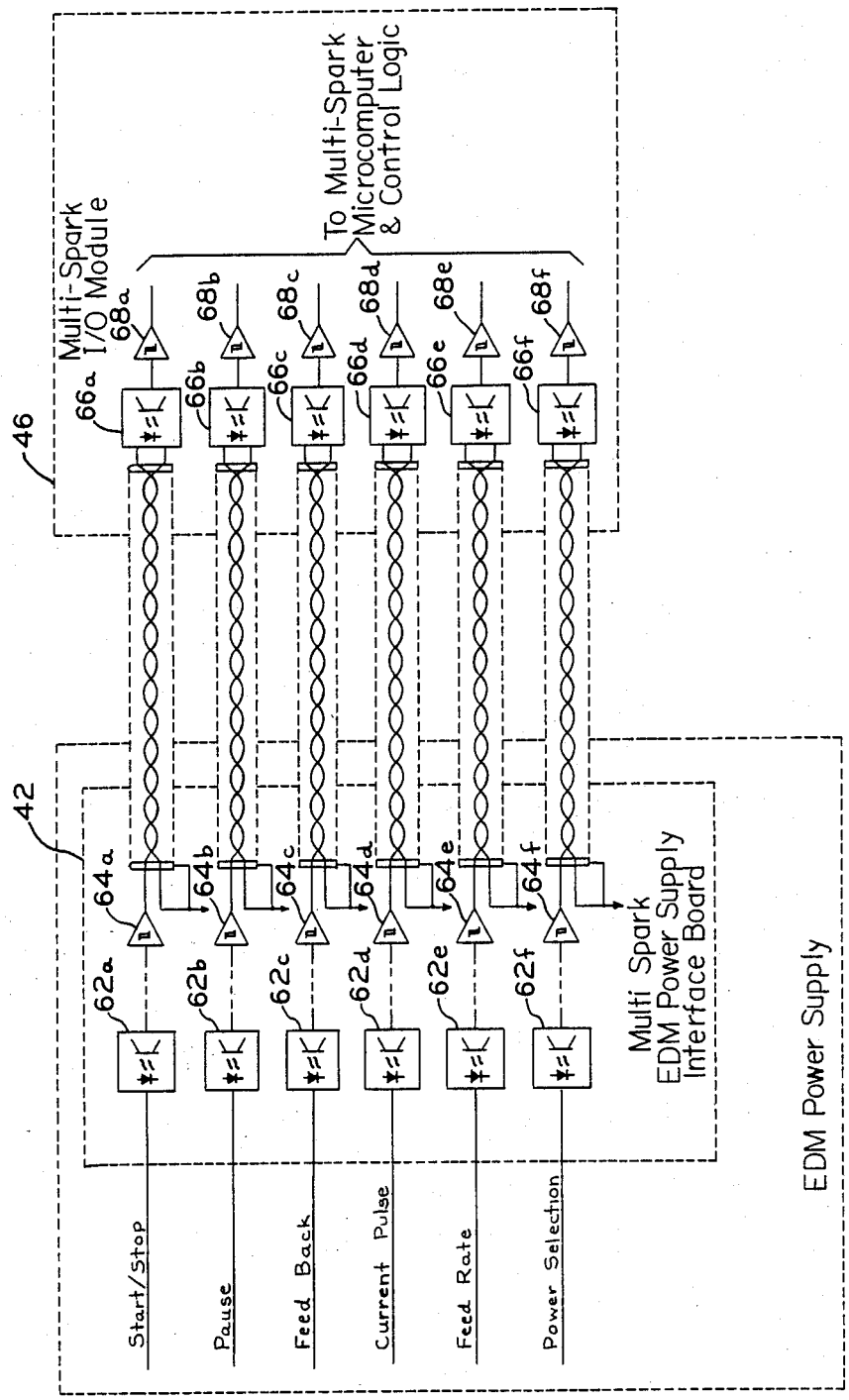
FIG. 2 is a diagram of the interface between the electrical discharge machine and the multi-spark control unit.

Referring now to FIG. 2, the interface 42 is illustrated in greater detail. In order for the microcomputer 44 to effectively control the mode of operation of the output stage 60, selected information concerning the instantaneous operation of the machine must be known. Therefore, selected operating parameters of the machine are communicated from the power supply control and servo system 40 to the multi-spark control 14 over the interface 42. For example, the following signals are passed to the microcomputer 44: start/stop, pause, feedback, current pulse, feed rate, and power selection. It should be noted that the multi-spark control 14 and interface 42 are intended as an add-on or option item to existing EDWC machines. In that respect, control over the operation of the actual numerical control program is effected by the power supply control and servo system 40. The multi-spark control 14 does not directly exhibit control over the positioning system, but does need to "know" the current operating parameters in order to properly configure the output stage 48.

Each of these operating parameter signals is delivered to a corresponding optical isolator 62a–62f to increase immunity from interference caused by slightly varying ground potentials present in the multiple cabinet physical layout prevalent in the machine tool industry. Further, machine tools used in a manufacturing environment are typically exposed to large amounts of electromagnetic interference. Consequently, numerous provisions for enhancing noise immunity are employed by the interface. Schmitt triggers 64a–64f deliver the signals over twisted pair lines. The signals are received in the I/O module 46 by another set of optical isolators 66a–66f which deliver their outputs to corresponding Schmitt triggers 68a–68f. The outputs of these Schmitt triggers are delivered directly to the microcomputer and control logic 44 where the microcomputer 44 operates under software control to derive control signals for the output stage 48.

Figure 3:
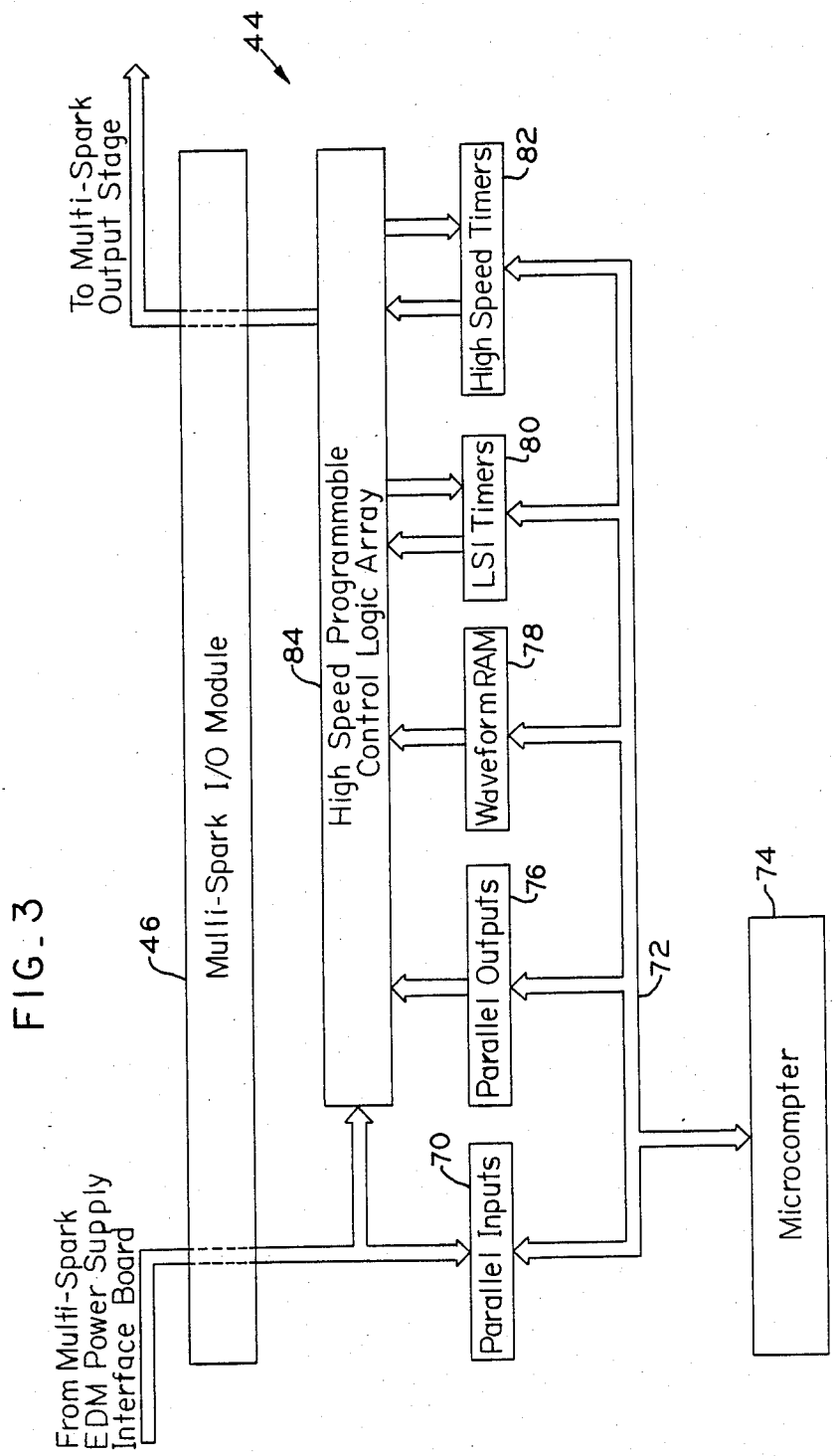
FIG. 3 is a block level diagram of the multi-spark control unit.

Referring now to FIG. 3, the internal structure of the microcomputer and control logic 44 is illustrated in block diagram form. Parallel input port 70 receives the signals from the Schmitt triggers 68a–68f and places these signals on a bidirectional bus 72. The bus 72 is connected to a microcomputer 74, as well as a series of other I/O devices 76, 78, 80, 82.

In particular, parallel output port 76 receives signals from the microcomputer 74 over the bus 72 and passes those output signals to a high speed programmable control logic array 84. The array 84 simply passes these output signals to the I/O module 46.

Figure 4:
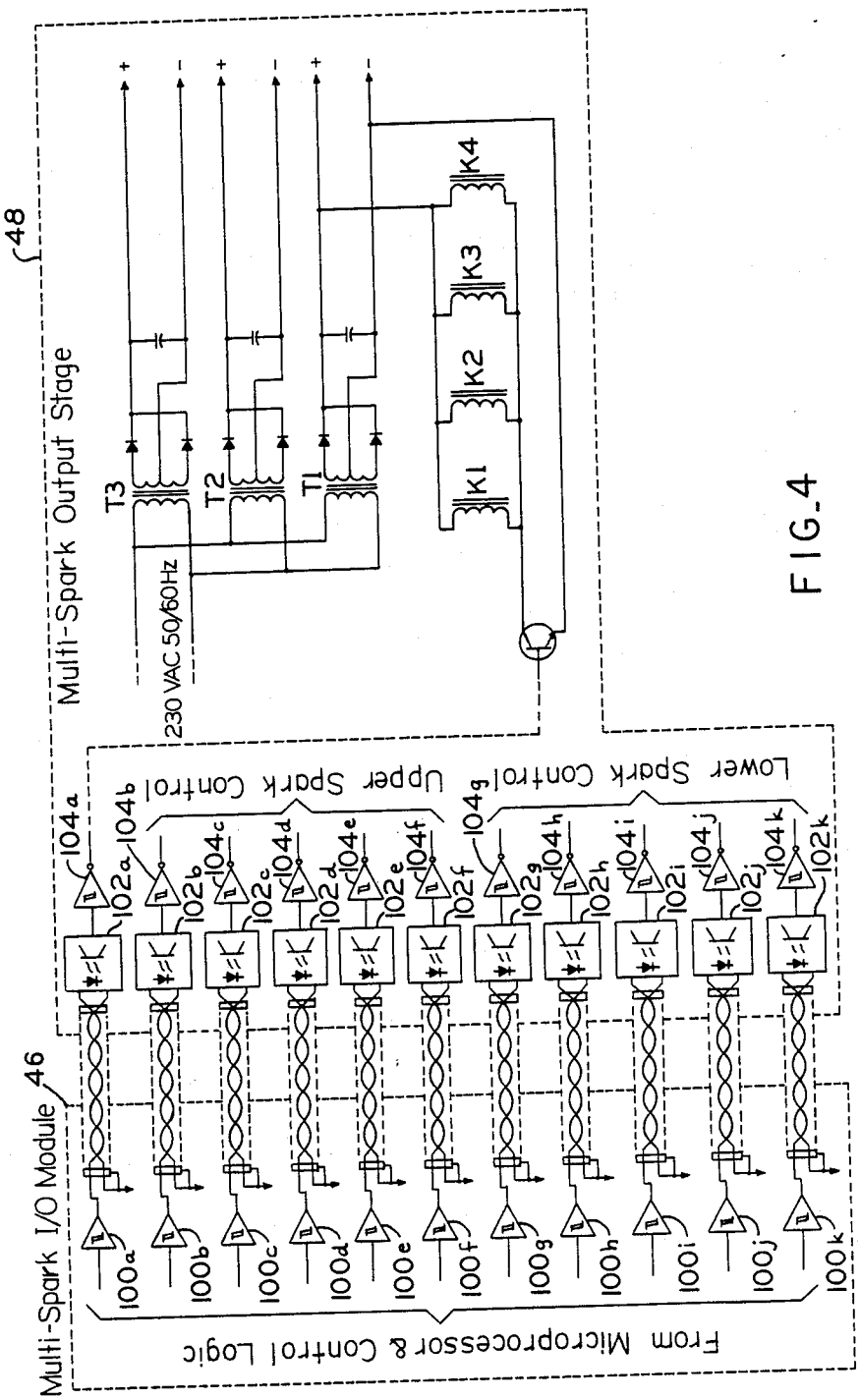
FIG. 4 is a diagram of the interface between the multi-spark I/O unit and the output unit.

FIG. 4 illustrates a detailed schematic of the output section of the I/O module 46 and a portion of the output stage 48. Once again the affects of electromagnetic interference and varying ground potentials are protected against by the use of Schmitt triggers, twisted pair communications cables, and optical isolators. Accordingly, the parallel output signals delivered by the array 84 are delivered to Schmitt triggers 100a–100k. The outputs of these Schmitt triggers 100a–100k are delivered over twisted pair communication lines to respective optical isolators 102a–102k. From the optical isolators 102a–102k the signals are delivered to another set of Schmitt triggers 104a–104k.

Eleven total signals are delivered to the output stage 48. The first of these signals, delivered by Schmitt trigger 104a, controls operation of relays K1–K4. The transformers T1–T3 and relays K1–K4 act as isolated power supplies to control the independent gates of the FETs described in connection with FIG. 5.

The remaining ten signals control operation of the switches 54a–54d, 56a–56d, 58, and 60. The outputs of the Schmitt triggers 104b–104f are labeled upper spark control, which generally refers to the array of capacitors 50a–50d and switches 54a–54d, 58 connected to the lead line 28. Similarly, the outputs of the Schmitt triggers 104g–104k are labeled lower spark control, which generally refers to the array of capacitors 52a–52d and switches 56a–56d, 60 connected to the lead line 30.

Figure 5:
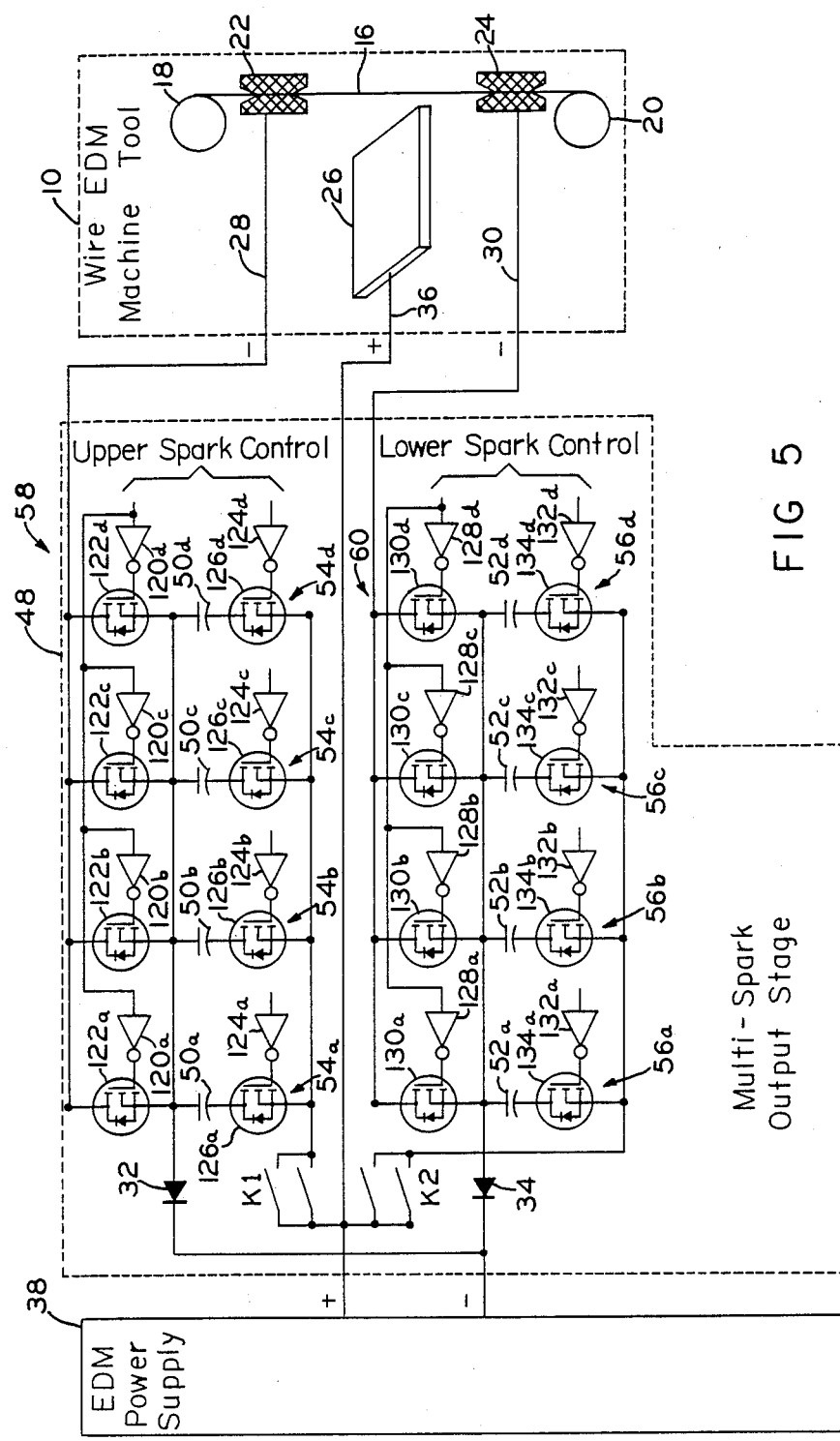
FIG. 5 is a schematic diagram of the interconnection of the power supply to the workpiece and wire electrode and, FIG. 6 is a top level block diagram of an electrical discharge wire cutting machine as shown in FIG. 1 and showing the utilization of multiple current pick-up pairs connected to the power supply and reusing the wire electrode.

Referring now to FIG. 5, a detailed schematic of the switching portion of the output stage 48 is illustrated. In particular, the interconnection between the upper and lower spark control outputs and their respective switches is illustrated. The output of the Schmitt trigger 104b controls the operation of the switch 58. The switch 58 is intended to function under high current conditions. Accordingly, the switch 58 is implemented by an array of four parallel switches. In this manner, the current is divided into four equal portions, such that any one of the parallel paths need only be capable of carrying one-fourth of the expected current. Therefore, the Schmitt trigger 104b is connected to the input of four inverters 120a–120d acting as FET drivers. The output of each of these inverters 120a–120d is connected to the gate of four respective field effect transistors 122a–122d. The drain of each of these transistors 122a–122d is connected to the anode of the diode 32, while the sources are all connected to the lead line 28. It can be seen that when the transistors 122a–122d are energized, current flows from the positive lead of the power supply 38 to the workpiece 26, across the deionized water gap to the wire electrode 16, through the current pick-up 22 and lead line 28, through transistors 122a–122d in parallel, through the diode 32, and back to the negative lead of the power supply 38.

While operation of the transistors 122a–122d is accomplished in common, the switches 54a–54d are individually controllable. The outputs of the Schmitt triggers 104c–104f respectively control the switches 54a–54d. Inverters 124a–124d respectively receive inputs from the Schmitt triggers 104c–104f and pass these inputs to the gates of field effect transistors 126a–126d. The drains for the transistors 126a–126d are connected in common to the positive output of the power supply 38. The sources for the transistors 126a–126d are connected to the anode of the diode 32 through capacitors 50a–50d respectively. Accordingly, the capacitors 50a–50d are individually connected in parallel with the deionized water gap between the work piece 26 and wire electrode 16. A second current path is formed beginning at the positive output of the power supply 38, through the transistors 124a–124d and their associated capacitors 50a–50d, and through the diode 32 to the negative output of the power supply 38. By controlling the outputs of the Schmitt triggers 104c–104f, varying values of capacitance are generated to produce varying effects on the sparks generated during capacitor discharge.

The lower spark control signals are connected and operate substantially identical to the upper spark control signals. The output of Schmitt trigger 104g is connected to the inputs of inverters 128a–128d which are passed to the gates of transistors 130a–130d to provide a parallel implementation of the switch 60. Similarly, the individual switches 56a–56d receive their controlling inputs from the outputs of the Schmitt triggers 104h–104k respectively. Inverters 132a–132d receive inputs from the Schmitt triggers 104h–104k and pass these signals to the gates of transistors 134a–134d. Accordingly, the two current paths present in the lower spark control are similar to those available in the upper spark control. The first current path begins at the positive output of the power supply 38 and passes to the workpiece 26, across the deionized water gap to the wire electrode 16, through the current pick-up 24 and lead line 30, through transistors 130a–130d in parallel, through the diode 34, and back to the negative lead of the power supply 38. In the second current path, current flows from the positive output of the power supply 38, through the transistors 134a–134d and their associated capacitors 52a–52d, and through the diode 34 to the negative output of the power supply 38.

The high-pressure deionized water aids in the removal of the chips of material melted during the EDWC process. This flushing by deionized water is further enhanced by introducing controlled vibrations onto the wire electrode 16. These controlled vibrations are produced by separately controlling the switching frequency of the upper and lower spark controls. For example, by controlling the switching frequency of the capacitors 50a-50d, 52a-52d to be the resonant frequency of the wire electrode 16, desirable vibrations are produced in the wire electrode 16. This additional flushing by wire vibration is particularly advantageous when cutting small radius arcs.

Conversely, there are also times when wire electrode vibration leads to reduced accuracy. During this mode of operation it is desirable to prevent, rather than induce vibrations, on the wire electrode 16. Accordingly, by selecting the capacitor switching rate to produce a standing wave on the wire electrode 16, any undesirable vibrations are cancelled out.

Finally, as discussed previously, the wire electrode 16 suffers significantly less local damage than experienced in prior EDWC machines. Therefore, while these prior machines use the wire electrode 16 for only a single pass through the workpiece 26 and are then placed on a collection spool and discarded, this is not so of the present invention. Rather, the wire electrode 16 suffers minimal spark erosion damage and, in fact, can be reused multiple times. A preferred method of reusing the wire electrode 16 is as shown in FIG. 6, to reroute the wire through multiple current pick-up pairs positioned in parallel with the original current pick-ups 22, 24. It should be noted that the additional pair of current pick-ups are connected to the power supply through a pair of isolated negative lead lines to allow for the independent spark producing capability. For each additional pair of current pick-ups an additional negative lead line and associated circuitry (as shown in FIG. 5) is preferably provided so that each cutting region of the wire electrode receives the enhanced cutting ability of the multi-spark operation. For example, using the wire electrode 16 to produce two parallel cuts requires a single positive lead line connected to the workpiece 26, a first negative lead line connected through isolation diodes 32, 34, and a second negative lead line connected through an additional pair of isoltion diodes to a second pair of current pick-ups. Further, an additional set of capacitors 50a-52d and switches 50a-52d, 122a-122d, 130a-130d are also connected to the second negative lead line so that the second cutting region of the wire electrode is controllable to perform all three modes of operation. This arrangement allows multiple piece parts to be cut in parallel from the workpiece 26. The increased productivity of parallel operation has clear economic advantages over single cut systems. Further, while a two-cut parallel system has been discussed as exemplary of multiple cut systems, it should be recognized that additional parallel systems are readily employed by duplicating multi-spark output stage 48 and current pick-ups 22, 24.

Such reusability reduces the mechanical complexity of prior systems which employed multiple output spools and only used each of the wire electrodes for a single pass through the workpiece 26. U.S. Pat. No. 4,243,864 issued Jan. 6, 1981 to Richard Vieau et al is exemplary of such prior art systems. It should be noted, however, that the multiple wire electrode arrangements similar to Vieau could be retrofitted with the multi-spark output stage to produce parallel cutting operations which enjoy the enhanced cutting speed of produced by multi-spark operation.

I claim:

1. An apparatus for controlling the flow of electrical energy between an electrically conductive piece part and a wire electrode of an electrical discharge wire cutting machine, comprising:
    a pulse type power supply having first and second leads of opposite polarity, said first lead being electrically connected to said piece part and said second lead having first and second portions connected to said wire electrode at two separate spaced apart locations;
    first and second storage means connected between said first lead line and said first and second portions of said second lead line; and,
    means for electrically isolating said first and second portions of said second lead line whereby said first and second portions of said second lead line are electrically independent from one another and whereby electrical energy may flow independently through said first and second portions of said second lead line.

2. An apparatus, as set forth in claim 1, wherein said isolating means includes first and second diodes respectively disposed in said first and second portions of said second lead line.

3. An apparatus, as set forth in claim 1, wherein said first and second storage means are independently controllably connected between said first lead line and said first and second portions of said second lead line respectively.

4. An apparatus, as set forth in claim 3, including means for controllably varying the capacity of said storage means.

5. An apparatus, as set forth in claim 4, wherein said first and second storage means includes a plurality of capacitors disposed between said first lead line and said first and second portions of said second lead line respectively.

6. An apparatus, as set forth in claim 5, wherein said varying means includes switching means for controllably connecting each of said capacitors to said first lead line and said first and second portions of said second lead line respectively in response to receiving a control signal.

7. An apparatus, as set forth in claim 6, including means for delivering control signals to enable said switching means to connect preselected combinations of said capacitors between said first lead line and said first and second portions of said second lead line respectively.

8. An apparatus, as set forth in claim 7, wherein said control signal delivering means monitors preselected parameters of said electrical discharge wire cutting machine and determines the value of the control signals in response to the values of said preselected parameters.

9. An apparatus, as set forth in claim 7, wherein said control signal delivering means includes means for controlling the frequency of said control signals whereby the frequency of said capacitor discharges is controlled to a preselected rate.

10. An apparatus, as set forth in claim 9, wherein said frequency controlling means produces a preselected rate of capacitor discharge having a frequency substantially identical to the resonant frequency of the wire electrode.

11. An apparatus, as set forth in claim 9, wherein said frequency controlling means produces a preselected rate of capacitor discharge having a frequency sufficient for generating a standing wave in the wire electrode.

12. An apparatus, as set forth in claim 1, wherein said wire electrode includes a second portion adjacent said workpiece a preselected distance from and in parallel with the first portion of the wire electrode positioned between the first and second portions of the second lead line whereby movement of the workpiece produces identical cuts by the first and second portions of the wire electrode.

13. An apparatus, as set forth in claim 12, wherein said power supply includes a third lead having a polarity substantially identical to the second lead polarity, said third lead having first and second portions connected to said wire electrode at two separate spaced apart locations at the second portion of said wire electrode, and means for electrically isolating said first and second portions of said third lead line whereby said first and second portions of said second lead line are electrically independent from one another.

14. An apparatus, as set forth in claim 13, wherein said isolating means includes first and second diodes respectively disposed in said first and second portions of said third lead line.

15. An apparatus, as set forth in claim 14, including third and fourth storage means independently controllably connected between said first lead line and said first and second portions of said third lead line respectively.

16. An apparatus, as set forth in claim 15, including means for controllably varying the capacity of said storage means.

17. An apparatus as set forth in claim 16, wherein said third and fourth storage means includes a plurality of capacitors disposed between said first lead line and said first and second portions of said third lead line respectively.

18. An apparatus, as set forth in claim 17, wherein said varying means includes switching means for controllably connecting each of said capacitors to said first lead line and said first and second portions of said third lead line respectively in response to receiving a control signal.

19. An apparatus, as set forth in claim 18, including means for delivering control signals to enable said switching means to connect preselected combinations of said capacitors between said first lead line and said first and second portions of said third lead line respectively.

20. An apparatus, as set forth in claim 19, wherein said control signal delivering means monitors preselected parameters of said electrical discharge wire cutting machine and determines the value of the control signals in response to the values of said preselected parameters.

21. An apparatus for controlling the flow of electrical energy between an electrically conductive piece part and a wire electrode of an electrical discharge wire cutting machine, comprising:
- a pulse type power supply having first and second leads of opposite polarity, said first lead being electrically connected to said piece part and said second lead having first and second portions connected to said wire electrode at two separate spaced apart locations;
- first and second diodes respectively disposed in said first and second portions of said second lead line;
- first and second pluralities of capacitors disposed between said first lead line and said first and second portions of said second lead line respectively;
- switching means for controllably connecting each of said capacitors to said first lead line and said first and second portions of said second lead line respectively in response to receiving a control signal; and
- means for monitoring preselected parameters of said electrical discharge wire cutting machine, determining the value of said control signals in response to the values of the preselected parameters, and delivering said control signals to enable said switching means to connect preselected combinations of said capacitors between said first lead line and said first and second portions of said second lead line respectively.

* * * * *

UNITED STATES PATENT AND TRADEMARK OFFICE
CERTIFICATE OF CORRECTION

PATENT NO. : 4,894,504

DATED : January 16, 1990

INVENTOR(S) : Thomas J. Truty

It is certified that error appears in the above-identified patent and that said Letters Patent is hereby corrected as shown below:

On the title page, item [54]
In the title, after "METHOD" insert "AND".

Col. 6, line 8, after "nonconduct" insert --ing state prevents all of the--.

Col. 6, line 31, after "state" insert --the--.

Col. 6, line 42, change "Which" to --which--.

Col. 9, line 30, insert --,-- after "16 is".

Signed and Sealed this

Second Day of April, 1991

*Attest:*

HARRY F. MANBECK, JR.

*Attesting Officer*  *Commissioner of Patents and Trademarks*